United States Patent [19]

Robecchi et al.

[11] Patent Number: 4,786,274
[45] Date of Patent: Nov. 22, 1988

[54] FLEXIBLE BELT AND ITS ASSOCIATED TRANSMISSION

[75] Inventors: Edoardo Robecchi; Renato Dell'Orto, both of Milan, Italy

[73] Assignee: Industrie Pirelli S.p.A., Milan, Italy

[21] Appl. No.: 42,737

[22] Filed: Apr. 27, 1987

[30] Foreign Application Priority Data

May 21, 1986 [IT] Italy ............................. 20510 A/86

[51] Int. Cl.<sup>4</sup> ............................................. F16G 1/10
[52] U.S. Cl. ..................................... 474/263; 428/113; 428/298; 428/302
[58] Field of Search ............... 474/263, 265, 250, 252, 474/261, 262, 237, 249, 267–268; 428/113, 298, 302, 292

[56] References Cited

U.S. PATENT DOCUMENTS 207,626  9/1878  Sargent .......................... 474/252 X
3,416,383 12/1968 Jensen et al. ................... 474/263 X Primary Examiner—Thuy M. Bui
Attorney, Agent, or Firm—Stevens, Davis, Miller & Mosher

[57] ABSTRACT

A flexible belt, made of an elastomeric material, comprising an annular body, delimited by two base surfaces and by two lateral sides; at least one of the base surfaces disposed with a predetermined winding arc around a pulley from which it receives or, to which it transmits, motion by friction. The sides of the annular body are inactive for transmitting the forces by friction. The belt that is for example, flat, is extensible, and it comprises at least one group of three layers in direct contact with one another, each layer of which includes or comprises reinforcing fibers disposed in a single predetermined direction. In the reinforcing structure no inextensible cords are present. The belt may comprise an annular element on at least one of the base surfaces of the annular body, for opposing any lateral shifting relative to the transmission pulley.

12 Claims, 2 Drawing Sheets

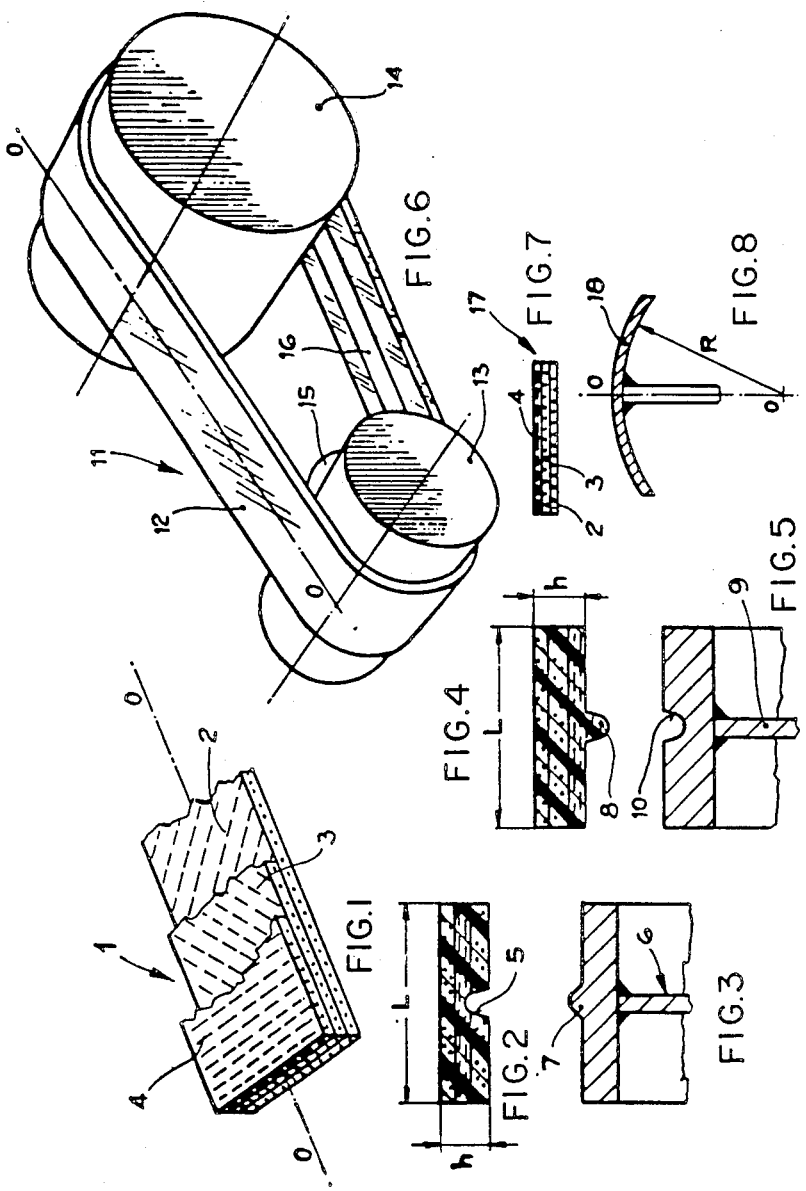

FLEXIBLE BELT AND ITS ASSOCIATED TRANSMISSION

DESCRIPTION

The present invention relates broadly to a flexible belt and its relative transmission; and more particularly, it relates to a belt, made of an elastomeric material, comprising an annular body delimited by two outer base surfaces, and two lateral sides. At least one of the two surfaces of the outer base may be disposed with a predetermined winding arc around the radially outermost surface of a pulley from which it receives, or to which it transmits, motion by means of friction.

The lateral sides of the annular body are always inactive as regards the transmission of motion by means of friction.

As is well known, there already exist belts of the above-cited type; flat, for example, that are utilized in diverse industrial applications especially owing to their high flexibility.

Generally speaking, the flat belts comprise an annular body made from an elastomeric material, wherein there are embedded inextensible cords that are disposed parallel to one another and, directed longitudinally with respect to the belt, one or more reinforcing layers made of fabrics, or as an alternative, laminated with polyamides, or with polyesters.

Unfortunately, owing to the presence and characteristics of the above-cited reinforcing and embedding materials in the elastomeric material, the said belts cannot be would around pulleys having, for example, very accentuated curvatures and especially around pulleys having diameters 15 or 16 mm or less.

Consequently, the known belt and transmission combinations have a limited usage and they can not be used for actuating for example, a washing-machine tub wherein for one of the pulleys, even smaller pulley diameters are necessary.

Moreover, at high speeds flat belts show a poor stability, with a tendency to shift laterally relative to the pulley or pulleys on which they are mounted with the risk of progressively slipping off the pulley itself.

However, no solution exists to date for enabling one to solve all of these cited drawbacks simultaneously.

In fact, if it is possible, on the one hand, to increase the stability of the belt by having recourse to stiffening of the relative reinforcing structure, on the other hand there must be taken into account the consequent lesser adaptability of the transmission belt, with regard to smaller pulleys having accentuated curvatures.

Hence, the object of the present invention is a flexible belt comprising at least one base surface, partially wound around a pulley, from which it receives, or to which it transmits motion through friction, and the associated transmission—with both components being free of all of the above-cited drawbacks.

More particularly, the object of the present invention is a flexible belt, made from an elastomeric material, suited for being mounted around at least two pulleys, upon whose outer surfaces there are exchanged frictional forces useful for transmitting motion, said belt comprising an annular body delimited by two outer base surfaces and two lateral sides, with at least one of the said base surfaces being active for the transmission frictional forces, and with both of the said lateral sides being inactive for the transmission of said frictional forces, said belt being characterized in comprising at least one group of three layers in which are embedded discontinuous fibers, with one of these layers having fibers directed transversely with respect to the longitudinal direction of the belt, the other two layers having fibers whose direction is inclined and opposed to one another with respect to the longitudinal direction of the belt, the angle of inclination of these fibers relative to the said longitudinal direction being at most 45°, the modulus of rigidity under tensile stress of the layers with said inclined fibers, measured in the longitudinal direction of the belt, being equal to each other, the said layers being in direct contact with one another, with said annular body being free of any continuous longitudinal inextensible elements.

A further object of the present invention is an arrangement for the transmission of motion comprising a flexible belt, made of an elastomeric material, and at least two pulleys on whose outer surfaces the belt is disposed according to a predetermined winding arc, and exchanges through friction forces that are useful for transmitting motion, said belt comprising an annular body delimited by two outer base surfaces and two lateral sides, at least one of said base surfaces being active for transmitting said frictional forces, said transmission being characterized in that said belt comprises at least one group of three layers wherein are embedded discontinuous fibers, one of said layers having its fibers directed transversely with respect to the longitudinal direction of the belt, the other two layers having their fibers disposed in directions inclined and opposed to one another relative to the longitudinal direction of the belt; the angle of inclination of the fibers, with respect to said longitudinal direction of the belt, being at most 45°, the modulus of rigidity, under tensile stress, of the layers with said inclined fibers, measured in the longitudinal direction of the belt, being equal to one another, the said layers being directly in contact with one another, with said annular body being devoid of any continuous, longitudinal and inextensible elements, the longitudinal development of the belt between the two pulleys being greater, due to stretching, than the longitudinal development of the belt prior to its mounting between the said pulleys.

Hereafter the expression 'active base surface' is intended to indicate the belt surface that is destined, during contact with a corresponding resting or supporting surface on a pulley, for providing, by means of friction, an exchange of forces useful for transmitting motion.

Hence, what are included within the scope of this invention are flat belts and other belts whose shape, although not flat in a section transverse to the longitudinal direction of the belt, constitutes at least one of the base surfaces useful for the purpose of transmitting motion through friction.

Therefore, in the same transmission arrangement the belt may have only one of its base surfaces, always the same one, in contact, on different pulleys, or even one of the base surfaces, for example, the lower one, in contact with one pulley and the upper one in contact with the other pulley, in the latter case with the consequent exchange of forces, through friction, by both of the two base surfaces of the belt.

Moreover, the expression 'inactive sides', is intended to indicate the fact that the lateral surfaces of the belt do not take part together with the pulleys in exchanging, by means of friction, the forces that are useful for transmitting motion.

Therefore, both lateral sides, in any configuration whatsoever, always remain inactive with regard to the pulleys, and they have the sole function of laterally delimiting or defining the annular body of the belt.

The present invention will be still better understood from the following detailed description offered solely by way of non-limiting example, and referring to the figures of the accompanying drawing wherein:

FIG. 1 shows a perspective partial view of three belt layers, according to the present invention;

FIGS. 2 and 3 show respectively a transverse section of a belt and, partially, of a pulley, of the transmission arrangement according to the invention;

FIGS. 4 and 5 show respectively a transverse section of a further embodiment of a belt and, partially, of a pulley of the transmission arrangement according to the invention;

FIG. 6 shows a perspective view of the transmission arrangement, according to the invention;

FIGS. 7 and 8 show further transverse sections, respectively, of a belt and, partially, of a pulley, in another transmission arrangement according to the invention.

Figure 9:
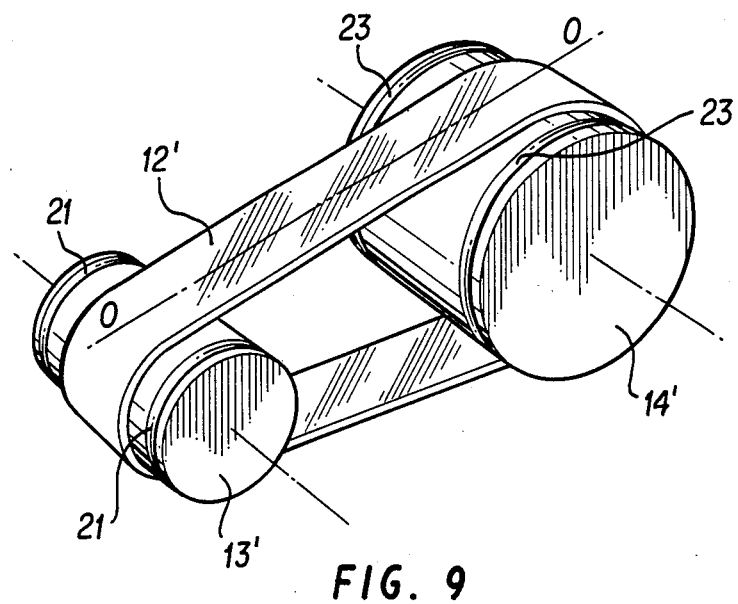
FIG. 9 shows a pair of pulleys having two annular grooves with a transmission belt disposed on the pulley between the grooves.

The present invention shall now be described in relation to a flexible belt, made of an elastomeric material, comprising in its more general form, an annular body deliminated, above and below, by two outer base surfaces and by two lateral sides; each one of the base surfaces being adapted to cover for a predetermined winding arc a pulley, from which it receives or to which it transmits motion through friction.

The lateral sides of the belt are disposed in such a way as to remain inactive with respect to the exchange of forces, transmitted by means of friction, with the pulley surfaces.

In the preferred example shown in FIG. 1, the belt 1 has a flat annular body defined by a transverse rectangular section, and comprising at least one group of three layers 2, 3, 4, of elastomeric material, each of which incorporates a plurality of discontinuous fibers that are oriented in a single direction in the particular layer.

In the example of FIG. 1, the layers 2 and 3 comprise fibers that are inclined in opposite directions, relative to the longitudinal direction 0—0 of the belt, with the maximum angle of inclination being equal to 45°, the stretch modulus of the two layers in the longitudinal direction of the belt being equal to each other. The fibers of one layer may have any angle of inclination opposed to that of the other layer with respect to the longitudinal direction of the belt, but with different values, and the fibers of one layer may be different from those of the other layer—provided that, in all embodiments care is taken that the fibers and the angles of inclination of the two layers 2 and 3, together with the elastomeric material are such that the stretch modulus of the bottom layer 2, in the longitudinal direction of the belt, is equal to the stretch modulus of the layer 3. For preference, the angles of the fibers in these two layers are symmetrical with respect to one another.

Still more preferably, the layers 2 and 3 comprise fibers having their angles of inclination greater than 18°, in one particular example, an angle of 20°.

In its turn, the upper layer 4 comprises discontinuous fibers directed transversely with respect to the longitudinal direction of the belt.

As can be seen in FIG. 1, the fundamental characteristic of the belt of the present invention resides in the disposition of the layers 2, 3, 4, with the sides directly in contact with each other, without the interpositioning of further layers or reinforcements, and with the fibers in the different layers extending in different directions.

Moreover, the belt of the present invention excludes layers having inextensible longiform elements directed longitudinally with respect to the body of the belt, such as wires, cords, and the like.

The elastomeric material of the layers may have Shore-A hardnesses that are between 60 and 90, and the percentage of the fibers incorporated in each layer, with reference to 100 parts by weight of rubber, may be between 5 and 50.

According to one example each such layer may have a thickness of 0.6 mm.

The fibers may be of various materials, amongst others particularly aramide resins, nylon, polyester, or other equivalent materials.

In particular, the fibers of each layer have a length that as an average may be between 0.5 and 5 mm and a diameter between $10\mu$ (microns) and $400\mu$ (microns).

The thickness of each layer is so selected as to be a function of the average length of the fibers. It has been found advantageous for having a good unidirectional orientation of the fibers to maintain a thickness of the layers less than the average length of the fibers.

A fundamental characteristic of the flat belt of the present invention is the possibility for it to undergo elastic elongations, for example of the order of 10% with a tensile stress of 20 $Kg/cm^2$, and to maintain said layer in a state of traction during use. This characteristic, and the corresponding values of elongation, depend upon the number of fibers present in the layers, upon the rubber matrix, upon the crossing angle between the fibers of the layers 2 and 3, upon the action of regulation of the shear stresses between the layers 2 and 3, during elongation where the action of regulation is due to the presence of the layer 4 having fibers at 90° with respect to the longitudinal direction of the belt.

Generally the stretch modulus (modulus of rigidity under tensile stress) in the annular body of the belt, measured longitudinally, may vary from layer to layer assuming greater values in those layers wherein the inclined fibers have smaller angles.

In particular there may be cited by way of example the presence of layers having a modulus of rigidity under traction of less than 10 $Kg/mm^2$. However, in any section of the flat belt, the longitudinal modulus of traction cannot be compared in any way with the moduli relative to flat belts having inextensible fabric, or laminated alternating layers of rubber and fabric, or cords.

In practice, the flat belt of the present invention is characterized in that the modulus of rigidity, under the tensile stress, measured in the longitudinal direction of the belt, is uniform over the entire transverse section of the annular body if compared to that of flat belts having longitudinal, inextensible inserts—and such as to assume values of less than 100 $Kg/mm^2$.

The belt 1, disclosed and illustrated with triple layers, may be formed by a greater number of layers provided that, in any embodiment whatsoever, any one of the layers having fibers directed in one of the cited directions is associated with two other layers, each one of which incorporates fibers directed in the other two directions.

Hence, to the three layers of FIG. 1, the inner one of which embeds fibers forming an angle of +20°, there may, for example, be directly associated, in an underlying position, another two layers, one layer with fibers at 90° and the other with fibers inclined at −20°; i.e., in such a way as to constitute, as a whole, two triple layers having one common intermediate layer.

The modulus of rigidity under tensile stress, measured in the longitudinal direction of the belt, is uniform since the overall longitudinal modulus of each of the various triple layers is substantially equal to that of each of the others.

According to some embodiments, the flat belt of the present invention, for any number of triple layers forming the annular body, is characterized by the following geometrical correlation (see FIG. 2):

$$K = h/W = 0.01 \text{ to } 0.8$$

where h is the thickness of the belt; W is the width; and K is the ratio between the two sizes, with a value in the above-cited range.

According to one example, the belt may have a thickness of 4 mm and a width of from 14 to 20 mm.

It was found that this ratio refers to flat belts which determine, with the pulleys to which they are associated, a highly elastic belting, in particular, on those pulleys having a very pronounced curvature, i.e., relatively small diameters.

In one embodiment, the invention comprises at least one groove 5 in the lowest layer 2 and extending longitudinally with respect to the belt (see FIG. 2).

In correspondence with the groove 5, at least one of the pulleys 6 (FIG. 3) on which the belt is partially wound, comprises a matching outwardly extending protuberance 7.

In another example, the means for counteracting the lateral shifting of the belt on the pulley comprises (FIG. 4) an outwardly extending protuberance 8 and, in correspondence with said protuberance, a groove 10 on at least one of the transmission pulleys 9 (FIG. 5).

In FIG. 6, there is again illustrated a transmission arrangement 11, comprising a flat belt 12, having at least one group of triple layers (as seen in FIG. 1), and two pulleys 13 and 14, the one of which has the lesser diameter being provided with a protuberance 15 for penetrating into a groove 16 of the belt for the purpose of avoiding any shifting of the belt from the axis 0—0 lying in the central plane of the transmission.

The belt, described up to now for use on pulleys having substantially cylindrical outer surfaces, may also be applied to pulleys with cambered surfaces.

For example the belt 17 (FIG. 7) formed with the layers 2, 3, 4, (shown in FIG. 1) may form part of a transmission arrangement where one of the pulleys, amongst other things the one having the lesser diameter (FIG. 8), assumes in a transverse section, a curvilinear configuration, having an arc of a circle with radius R, or even a parabolic, or an elliptical, or a hyperbolic arc. In this embodiment the same curvature of the pulley 18 may represented one of the means adapted for opposing the lateral shifting of the belt 17 with respect to the axis 0—0 of the central plane of the transmission.

In another example (FIG. 9), pulleys 13' and 14' are shown, each having a surface delimited on its sides by a pair of annular grooves 21 and 23 respectively, with belt 12' disposed between the grooves and, in the event of lateral shifting, penetrating with a portion of the elastomeric material into one or the other groove, in the axial direction of the pulley, in one sense, or in the opposite sense to it.

The belt, described up till now with reference to a flat form, and defined by a mid-plane containing the longitudinal axis and by two outer base surfaces parallel to each other above and below the mid-plane, may deviate from its flat form, by assuming on the outside forms that are only substantially flat. Intended by the terms substantially in this content are configurations having curvilinear profiles in the transverse sections of the belt.

According to some embodiments of the flat forms, there may be added or subtracted from the flat form above and below, two other portions of elastomeric material that are delimited or defined, in their turn, in a section transverse to the belt by external profiles, both concave or both convex, or else, with one concave and the other convex, or vice-versa.

In another embodiment, the belt may have a flat form on only one base surface relative to the axis 0—0 central mid-plane and, on the opposite base, it may assume a concave or a convex profile, in transverse section.

According to still another embodiment, in its transverse section the belt may assume the form of a convex lens, thus reducing the lateral sides to in effect coincide with two lines.

The said embodiments relative to belts defined by curvilinear profiles comprise, in their curvilinear form, further means (apart from the elastic traction to which the belt is subjected), that are adapted to counteract the lateral shifting of the belt.

In fact, these belts may be associated with pulleys which have, in their transverse section, an outer profile corresponding to the profile of the belt, or even a curvilinear profile, with different curvatures for achieving a better coupling condition between the belt-pulley contacting surfaces.

In practice, in the cited embodiments, in the absence of the above-cited grooves, or protuberances, any tendency of the belt to shift laterally, relative to the pulleys, is prevented owing to the transverse curvature of the pulley and of the belt; and even still more owing to the high state of elastic traction exerted by the pulley.

Furthermore, the variations described may also comprise outer curvilinear profiles combined with a protuberance, or with a groove, or even both, to be joined to corresponding grooves, or to protuberances, on one, or on both of the pulleys of the transmission arrangement.

In those embodiments where the belt deviates from its flat form, the geometrical ratio "K" may refer to the average thickness and to the maximum width of the belt.

It is quite evident how the belt of the present invention in all of its illustrated and described forms, thanks to the characteristics of elasticity, may be advantageously applied to transmission arrangements where the distance between the pulleys if fixed, and where the mounting of the belt requires the same to be stretched in such a way that the longitudinal development of the belt, between the two pulleys, will result in being greater than the longitudinal development of the belt prior to its being mounted between the same pulleys.

The invention thus achieves all its objectives. In fact, the reinforcing structure formed by the elastomeric layers combined with the fibers (as already indicated) allows for the winding of the belt on pulleys having very pronounced curvatures up to a value of 15 or 16 mm in diameter, with a very effective exchange of torque between belt and pulley.

In practice, for belts having the indicated structures, devoid of inextensible cords and the like, which are subjected to stretching between the two pulleys, there is thus determined for the entire thickness practically equal tractional states on the different layers.

In other words, the tensile stress of the outermost layer does not differ, except for perhaps a small extent, from the tensile stress of the intermost layer, for which reason no tangential forces are encountered in the various layers between continuous surfaces which could as a result create reciprocal detachments of the layers.

Moreover, the possibility of exploiting to the maximum said stretching capacity of the elastomeric material, devoid of cords, and of increasing in this way the corresponding radial load that can be imposed by the belt layers on the pulleys, while having a greater elastic grip on the same, may be had as a result of adopting a belt whose base-width is very narrow.

Consequently, even pulleys having a narrow width, assuming masses that are relatively lighter masses, have a smaller risk of initiating vibrations that could facilitate the phenomenon of belt slipping, in the axial direction of the pulley.

The special structure defined by the triple layers having inclined fibers and transverse fibers moreover helps to prevent phenomena of instability arising in the belt body.

This result is not easily explicable except through supposition, given the complexity of the phenomena at play.

It can be supposed that the two layers having equally inclined fibers with respect to the longitudinal direction of the belt, allow (in the absence of continuous or the like cords disposed longitudinally) for a gradual stretching of the belt body until a predetermined angle value is obtained between the two directions of the fibers, with a lesser angle of inclination to that of the starting angle.

In practice, it has been established that in the presence of any kind of stresses these cited angular variations take place freely. Subsequently, due to the said elasticity of the material, when these stresses cease the said angles between the fibers, return to their initial values.

The phenomenon is moreover controlled by the presence of the layer of fibers disposed at 90° with respect to the longitudinal direction; said fibers tend to oppose the reduction of the angle of inclination between the fibers of the other two layers with, in this way, conferring particular elastic characteristics of the structure.

In practice, the belt of the present invention does not become twisted, most probably owing to the controlling action of the layer of fibers at 90°.

Furthermore, the presence in some embodiments of protuberances and of grooves on the belt and on the pulley, or of the curvilinear surfaces of the pulleys upon which the belt rests, constitutes yet another advantageous characteristic for obviating lateral shifting of the belt, from the position at rest and from the correct alignment of the belt on the pulley surfaces.

In particular, the presence on the surface of the belt (see FIG. 2) of the grooves 5 is not only seen as an element for counteracting any lateral shifting of the belt, but also as a further element that is in of itself useful for the transmission of motion.

In fact, the state of traction imposed on the belt, with the extension of the same, determines a contraction in the transverse sense with a consequent tightening of the groove 5 on the protuberance 7 (see FIG. 3) of the pulley.

Hence, the transmission of torque between the belt and the pulley takes place both through friction between the base surfaces, as well as through a gripping effect between the walls of the groove 5 and the walls of the protuberance 7.

Practically and quite advantageously, the presence of a space or groove 5 in the thickness of the belt is not at all detrimental to the torque, but in fact tends towards increasing its value.

What has still to be pointed out is how, in the belt of the present invention, the co-action between the belt-groove and the pulley-protuberance, or vice-versa, turns out to be constant and reliable with the passage of time, even in the presence of strong vibrations, as has been shown for a pulley joined to the tub in a washing-machine.

In fact, the high degree of elasticity that is inherent in the belt of the present invention tends to maintain the relative groove in the position for being fitted into the protuberance in the pulley, and thus having a corresponding immediate opposition to any lateral side-slipping of the belt and thus leaving its desired position on the pulley.

In practice, the belt behaves like an energy accumulator adapted for storing great quantities of elastic energy through being stretched, and which is ready at any moment to return this energy and to translate it into a belt fastening grip on the pulleys, every time that vibrations tend to move the stretched belt from its normal winding position on the pulleys.

Furthermore, and what is also considered to be especially advantageous in the belt of the present invention, is its greater fatigue life in comparison to belts having reinforcing structures comprising elements that are inextensible in the longitudinal direction. In fact, upon winding on the pulleys, those prior art belts are subjected to a flexional state, and the rubber parts, lying below the inextensible elements that define the neutral axis, pass practically from the condition where stresses are absent, to a state of compression. As is readily noted, this variation in states gives rise to various drawbacks in the form of cuts and cracks in the rubber, and in particular, a lesser fatigue resistance.

The belt of the present invention that is subjected, during the transmission of motion, to elastic stretching which may, in some applications, be between 5% and 15%, is found to be always in a state of traction for all the conditions before, during and after the winding of the pulleys.

Consequently, the belt of the present invention, in not having to pass from a null state of stress to a state of compression, or from a state of traction to one of compression, gives a greater service life in comparison to the above-cited conventional belts.

Although only some embodiments of the present invention have been illustrated and described herein, they are intended to comprise in their ambit all those possible variations of the inventive principle that are available to one skilled in the art. For example, the belt with the above-cited triple layers may have its entire base surface arranged for coming in contact with a pulley that is provided with a plurality of longitudinal V-shaped grooves which couple with corresponding pulley protuberances.

Furthermore, the transmission may comprise means for counteracting any lateral shifting of the belt that are applied on only one, or on both of the pulleys, for example, two annular grooves that are spaced apart on the outermost surface of the pulleys into which the belt may sink one of its small portions in the event of lateral shifting that involve the cited grooves, or still again, for example, one or two lateral flanges on the pulley.

What is claimed is:

1. Flexible and elastically stretchable belt made from an elastomeric material, adapted for being mounted around at least two pulleys, upon whose outer surfaces there are exchanged frictional forces for transmitting motion, said belt comprising an annular body delimited by two outer base surfaces and by two lateral sides, with at least one of the said base surfaces being active for the exchange of said frictional forces, and with both of the said lateral sides being inactive for the exchange of said frictional forces, said belt comprising at least one group of three layers with discontinuous fibers embedded therein, with one of these layers having fibers directed transversely with respect to the longitudinal direction of the belt, the other two layers having fibers whose direction is inclined and opposed to one another with respect to the longitudinal direction of the belt, the angle of inclination of the fibers of said other two layers relative to the said longitudinal direction being at most 45°, the modulus of rigidity under tensile stress of said other two layers with said inclined fibers, measured in the longitudinal direction of the belt, being equal to each other, the three said layers being directly in contact respectively with one another with said annular body being devoid of any continuous, longiform and inextensible elements and the modulus of rigidity, under the tensile stress, measured in the longitudinal direction of the belt, being uniform over the entire transversal section of the annular body, whereby said belt, subjected to elastic stretching between the two pulleys, has equal tractional states on the different layers of the entire thickness and remains always in a state of traction, before, during and after the winding on the pulleys.

2. Belt as defined in claim 1, comprising an annular body having a uniform thickness throughout its entire width.

3. Belt as defined in claim 2, comprising an annular body having a rectangular transverse section.

4. Belt as defined in claim 1, having a section transverse to the belt wherein at least one of the base surfaces is delimited by a curvilinear profile.

5. Belt as defined in claim 1 or 2 or 3 or 4, comprising means for counteracting lateral shifting of the belt on the pulleys.

6. Belt as defined in claim 5, wherein said means comprise at least one groove upon at least one base surface of the annular body, said groove being present over the entire longitudinal development of the belt.

7. Belt as defined in claim 5, wherein said means comprise at least one protuberance upon at least one base surface of the annular body, the said protuberance being present over the entire longitudinal development of the belt.

8. Means for the transmission of motion, comprising a flexible belt made of an elastomeric material and at least two pulleys on whose outer surfaces the belt is disposed according to a predetermined winding arc, and adapted for the transmission by friction of forces that are useful for transmitting motion, the said belt comprising an annular body delimited by two outer base surfaces and two lateral sides, at least one of said base surfaces being active for exchanging said frictional forces, said means for transmission of motion being characterized in that said belt comprises at least one group of three layers embedding discontinuous fibers, one of said layers having fibers directed transversely with respect to the longitudinal direction of the belt, the other two layers having fibers with directions inclined and opposed to one another relative to the longitudinal direction of the belt; the angle of inclination of the fibers, with respect to said longitudinal direction, being at most 45°, the modulus of rigidity, under tensile stress, of the layers with said inclined fibers, measured in the longitudinal direction of the belt, being equal to one another, the said layers being directly in contact with one another, with said annular body being devoid of any continuous, longitudinal and inextensible elements, the longitudinal development of the belt, between the two pulleys, being greater than the longitudinal development of the belt prior to its mounting between said pulleys.

9. Means for transmission of motion, as defined in claim 8, comprising means for opposing the lateral shifting of the belt relative to the contacting surfaces of the pulleys.

10. Means for transmission of motion, as defined in claim 9, wherein said means comprise at least one protuberance extending longitudinally on at least one surface of the belt, and an annular groove on at least one pulley, said protuberance being inserted into the said groove during the winding of the belt on the pulley.

11. Means for transmission of motion, as defined in claim 9, wherein said means comprise at least one groove extending longitudinally on at least one surface of the belt, and at least one protuberance on at least one pulley.

12. Means for transmission of motion, as defined in claim 8, comprising on at least one pulley, a surface delimited on its sides by two annular grooves, said belt being disposed between the two grooves and penetrating with a portion of the elastomeric material into one or the other groove, in the event of lateral shifting, in the axial direction to the pulley, in one sense, or in the opposite sense to it.

* * * * *